UNITED STATES PATENT OFFICE.

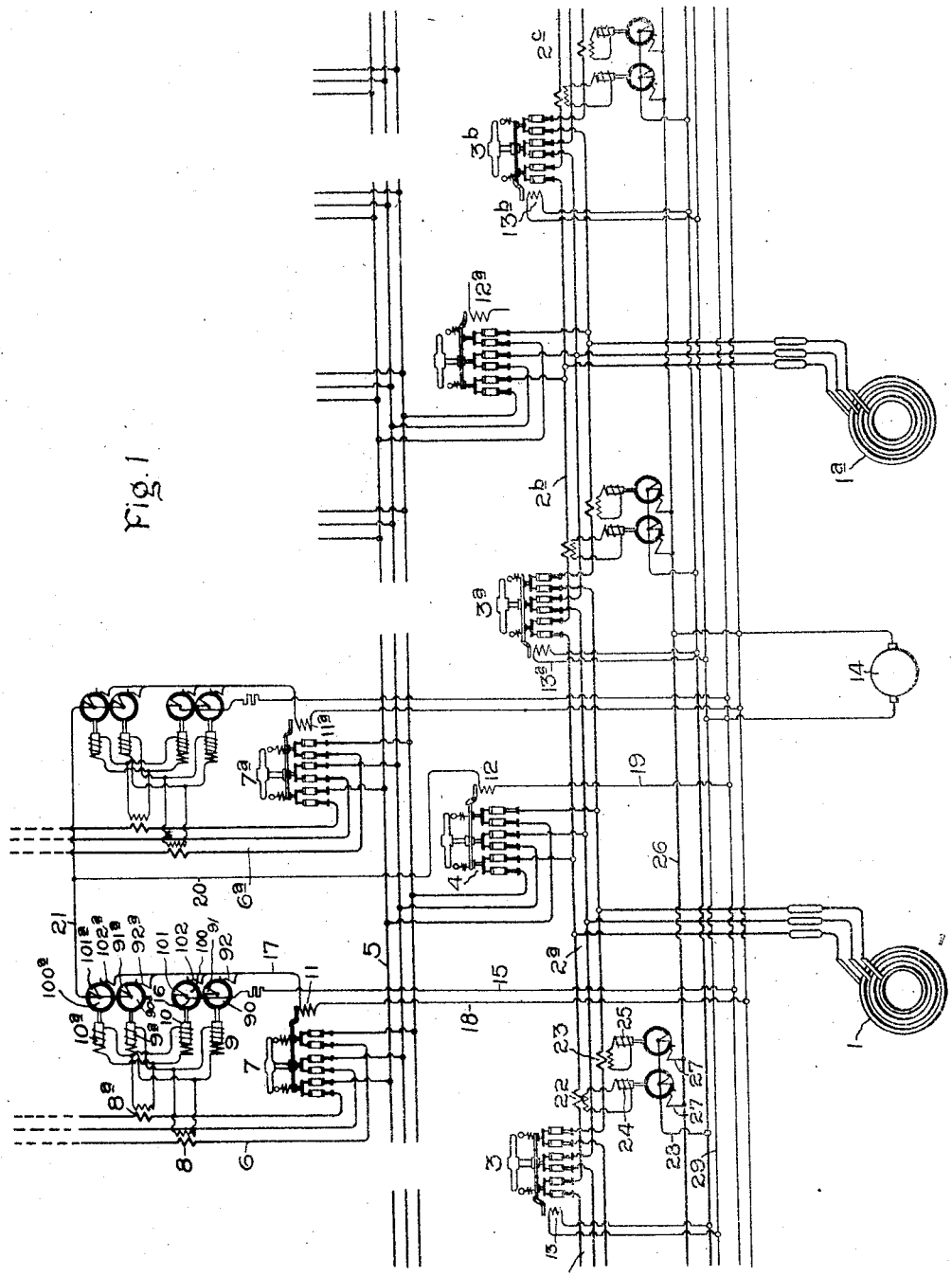

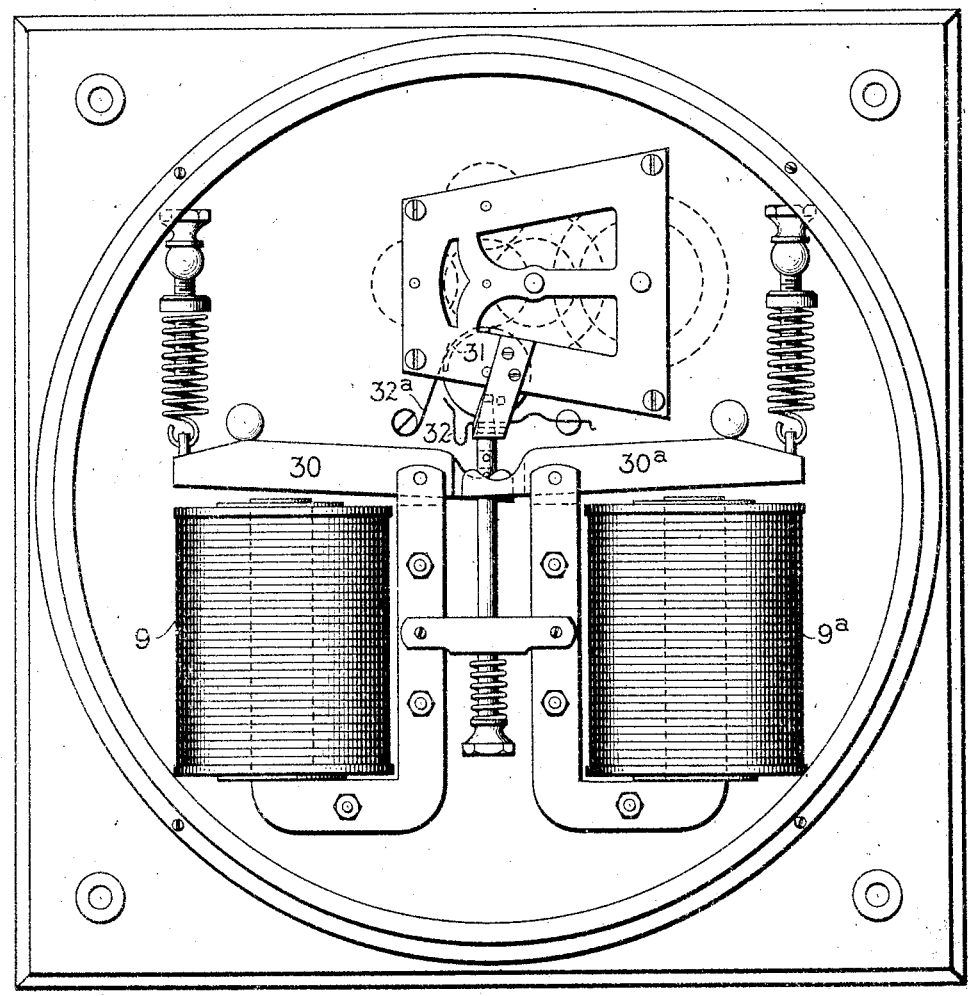

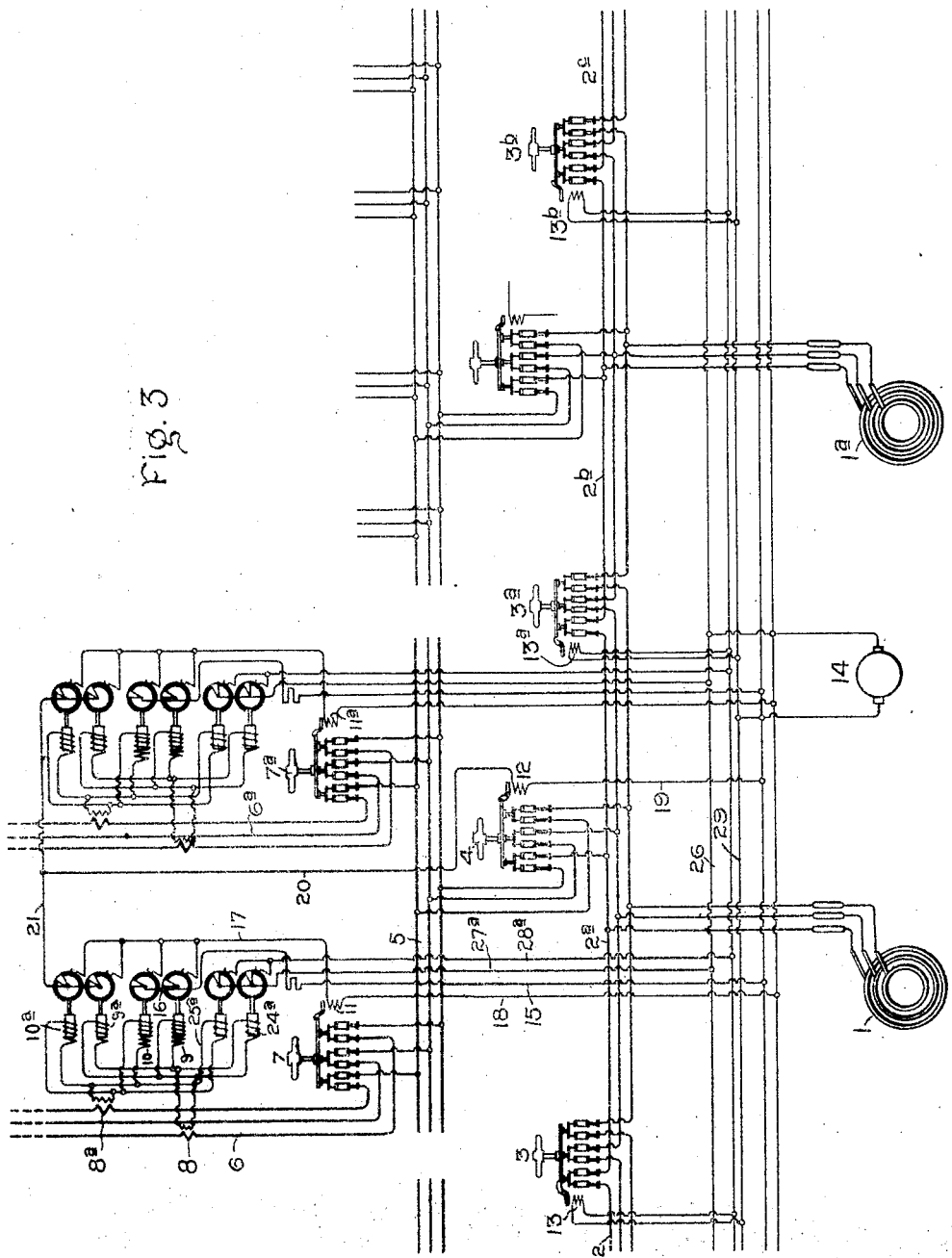

SAMUEL W. MAUGER, OF SCHENECTADY, NEW YORK, ASSIGNOR TO GENERAL ELECTRIC COMPANY, A CORPORATION OF NEW YORK.

SWITCHING ELECTRIC CURRENTS.

No. 890,783.

Specification of Letters Patent.

Patented June 16, 1908.

Application filed June 26, 1902. Serial No. 113,217.

*To all whom it may concern:*

Be it known that I, SAMUEL W. MAUGER, a citizen of the United States, residing at Schenectady, in the county of Schenectady, State of New York, have invented certain new and useful Improvements in Switching Electric Currents, of which the following is a specification.

In the distribution of electric energy on a large scale, the large volume of current handled at the generating station renders it particularly desirable to prevent overloading the smaller switches, as the feeder switches, in case of a short-circuit. Such protection becomes particularly imperative in the case of high-potential currents, as employed in alternating-current systems of distribution.

It is the object of my invention to afford such protection.

I carry out the invention by selectively controlling the switch-operating mechanism so that in case of an extraordinary overload not only the feeder switch but a switch of greater capacity behind it, as a group switch or a main bus-bar switch, or both, may be operated in time to save the transmission of the excessive current over the smaller switch for a dangerous interval.

My invention comprehends generally any means by which such a selective action may be exercised. By preference however I arrange the apparatus so that the controlling devices operate the feeder switch or one of limited capacity at a predetermined overload, and both the feeder switch and group switch at a somewhat greater overload, the controlling devices being adjusted to act more quickly at the higher current limit. This arrangement in the case of a load exceeding the capacity of the feeder switch gives the effect of two switches opening in series, one of a capacity adapted for the current that may pass at that large current limit. The main bus-bar switches behind the group switch may be, and preferably are, also provided with tripping means adapted to be actuated in case of a still greater current limit, and are so adjusted that they will act in a shorter time interval than either of the others. By this means perfect protection is afforded the station, and the contingency avoided of having a large portion of the distributed load cut off from the station except when absolutely necessary for the safety of the system.

The invention will be particularly described in connection with a type of distributing system for which it is well adapted, and in which actual current conditions have called for its exercise. It is to be understood however that the essential features are not limited to alternating currents or high-potential currents, but are generally applicable to systems of distribution where currents of large volume are handled. For example, in street railway service where a single station may have an aggregate output of 50,000 kilowatts the switching apparatus is of expensive construction and its safety is a matter of considerable financial importance to the supply company.

In the accompanying drawing the invention has been shown therefore as applied to an alternating-current system of distribution.

In the drawings Figure 1 illustrates in diagram a station supplying currents of this character; Fig. 2 shows a type of time limit device suitable for my improvements, and Fig. 3 is a diagram similar to Fig. 1 illustrating a modified arrangement.

1—1ª represent a group of generators supplying a sectionalized main bus-bar 2—2ª—2ᵇ—2ᶜ, between the several sections of which are placed bus-bar switches 3—3ª—3ᵇ, etc. In high-potential switches a multipolar oil break is employed, and switches of this type are diagrammatically shown in the drawing, the movable contacts being mounted on a frame and adapted to close the circuit under oil inclosed in a group of small closed pots. Switches of this type are of well-known commercial form and have been particularly described in the Patent No. 815,824, granted March 20, 1906 to Edward M. Hewlett.

The movable frame carries a number of bridging contacts adapted when the frame is depressed to bridge corresponding pairs of well insulated fixed contacts penetrating the several pots. They have been shown diagrammatically in the drawing as if closed by hand and drawn back by a spring, being held in the closed position by a latch governed by a trip-coil. In actual practice the switches are motor-operated and open and close with a quick spring movement, the energy being stored in the spring by the operation of the motor. In addition to the main switches between the parts of the sectionalized bus-bar, a group switch, as 4, for each group of feeders is employed connecting through an auxiliary bus-bar 5 with the several feeders 6—6ª, a feeder switch 7—7ª being interposed to protect the individual feeder circuits. This portion of the system has been already practiced.

My invention resides in rendering the operation of these several switches selective so that in case of an ordinary overload only the several feeder switches which are overloaded may be tripped, and may be relied upon to act with safety within the current limits for which they are adapted. But in case of a much larger overload it is desirable to protect these feeder switches and to insure the simultaneous operation of a second and larger switch which is adapted to carry such overload. I therefore insure by the arrangements of my invention that in case of a severe overload such as might endanger the feeder switch, or other apparatus in circuit, the group switch 4 behind it will also be tripped, and in case of a still greater overload the main switches 3 will be tripped thus isolating the generators on their several bus-sections, these actions being rendered selective so that the dangerous overload will be caused to act more promptly than smaller overloads. I effect this desirable result by means of an electro-responsive device governed by the load on the feeders and acting in case of a minimum excess of overload to close a direct-current circuit through the trip-coil of the feeder switch; but in case of the higher overloads closing the circuit through the trip-coils of the group or main switches respectively.

8—8ª represent series transformers connected in enough leads of the feeder circuit to insure the tripping of the switches in case of an overload on any lead. By way of example a triphase system is shown in the drawing, this however being merely for the sake of illustration, and therefore two transformers are employed, by reason of which, if an overload exists on any branch of the circuit some one transformer will be affected. The secondaries of these transformers are connected in circuit each with two relays 9—9ª and 10—10ª, the armatures of which, when the relays are sufficiently energized, free time limit devices which are diagrammatically represented in the drawing by disks 90, 90ª, 100 and 100ª having contact surfaces 91, 91ª, 101 and 101ª which coöperate with the fixed contacts 92, 92ª, 102, 102ª to close a local circuit, as indicated in the diagram. The relays have been shown merely as solenoids the cores of which are drawn backward when they are overexcited and free the disks so that they are free to rotate and bring the two relay contacts into engagement.

11—11ª represent the trip-coils for the feeder circuit-breakers or switches, 12—12ª those for the group switches, and 13—13ª—13ᵇ those for the main bus-bar switches. The tripping circuits are all fed from a small direct-current machine 14, and bus-bars supplied thereby. In any event the parts are so arranged that the relays 9—10—9ª—10ª close their local circuits under different strengths of current in the distributing feeder. This is indicated in the diagram by the relative number of turns of the relay windings. Assuming that the minimum overload for which the circuit is to be broken occurs the relay 9 or 10 will be affected irrespective of the leg of the circuit which may be overloaded, since one or the other of the transformers will act. In either case the relay 9 or 10 operates its armature and after a definite time interval closed a local circuit from the exciter 14 over wire 15, cross-connection 16, wire 17, trip-coil 11 and wire 18, thereby tripping the feeder switch.

The relative time intervals are represented diagrammatically by the relative distances between the contacts on the disks and their respective fixed contacts. Many forms of time limit devices exist which may be employed. One form well adapted for my purpose is shown and described in Patent No. 832,577, granted Oct. 2, 1906, to E. M. Hewlett. Such a type is shown in Fig. 2 of the drawings in which 9, 9ª represent the relay coils supplied by the transformers, 8, 8ª; either of the armatures 30, 30ª may release a clock train, which will slowly rotate a circuit closing disk which carries a segment 31. When either armature is attracted contact 32 is raised in the path of segment 31 and if the overload lasts the segment will at end of the time limit bridge contacts 32, 32ª and energize the circuit containing the trip coil. If on the other hand the overload should cease before the time expires, contact 32 will fall away from the disk and thus the trip circuit cannot be closed when the segment reaches a bridging position. The time limit may be varied by varying the position of the contacts with relation to the bridge piece when the clockwork is at rest. In case of a greater overload occuring on the feeder, one or the other of the relays 9ª—10ª, which are set for the higher overload, will be operated. The timing device of this is preferably set at a shorter limit than the companion relays 9—10, so that the higher current will not endure for a dangerous time interval. When energized by the predetermined overload, either of these relays closes a trip-circuit from the exciter 14 over the lead 19, trip-coil 12 of the group switch, wires 20 and 21, across the relay contacts to wire 17, and thence by trip-coil 11 of the feeder switch and wire 12 back to the other pole of the exciter. Thus both the feeder and group switch are simultaneously operated and by acting together more easily rupture the circuit.

In case of a still more excessive overload, I provide for the operation of the main bus-bar switches 3—3ª, etc. These might be operated by the same transformers in the feeder circuit which govern the action of the other relays, as hereinafter indicated, a third relay of weaker pull and shorter time-limit being introduced adapted to respond to the higher current value. But I prefer to place the transformers governing these switches in the bus-bars 2—2ª, etc., and series transformers, as 22—23, for the several busses acting on corresponding relays 24—25, when either of which acts the trip circuit is closed from the exciter by way of wires 26—27—28, through the trip-coils of all of the main switches in parallel and back to the other pole of the exciter by way of wire 29. The parts may be so arranged as to trip all of the main switches or only those at each side of the main bus section which supplies the overload to the feeder, thereby only interfering with such portion of the load as is involved, but I prefer the arrangement shown, by which all of the switches act thus dividing the load and not overtaxing any one switch. By means of this selective action I insure the integrity of the service so long as it is possible and interfere to a minimum degree with such parts of the service as are not affected by the trouble to be cared for. Besides this I differentiate between the feeder, group and main switches, calling the heavier switches into action only when necessary and under such conditions causing them to respond in less time than the smaller switches, thus avoiding overtaxing the distributing wires and apparatus.

In Fig. 3 I have illustrated the modification above referred to wherein the third relay is governed by the same transformers which govern the action of the other relays, viz: transformers 8 and 8ª. These relays, designated 24ª and 25ª, are connected in circuit with the secondaries of the transformers 8, 8ª and when either acts the trip circuit is closed from the exciter by way of wires 26, 27ª, 28ª through the trip coils of all the main switches in parallel and back to the other pole of the exciter by way of wire 29.

While I have described the feeder, group and bus-section switches as of different capacity, I may employ switches of uniform capacity throughout the station, the joint tripping of two or more switches in series on heavy overloads opening the circuit with sufficient certainty and margin of safety to permit this to be done.

What I claim as new and desire to secure by Letters Patent of the United States is,

1. An electric distribution system comprising a generator and several feeders, a plurality of switches between the generator and feeders, means for opening said switches under different loads, and selective devices determining the operation of one or more switches according to the character of the load.

2. An electric distribution system comprising a generator and several feeders, a plurality of switches in series between said generator and feeders, means for opening said switches under different loads, and selective devices determining the operation of one or more switches according to the character of the load.

3. An electric distribution system comprising a feeder and generator, a plurality of automatic circuit-breakers at the distributing station in series between the feeder and generator, electro-responsive devices for tripping the same at determinate load conditions, and means for selectively operating the circuit-breakers according to the character of the load.

4. An electric distribution system comprising a feeder and generator, a plurality of automatic circuit-breakers of different capacity at the distributing station in series between the feeder and generator, electro-responsive devices for tripping the several circuit-breakers operative at different loads, and timing devices for permitting the several tripping devices to respond in times varying inversely as the increase of load.

5. An electric distribution system comprising a generator, a plurality of automatic feeder circuit-breakers, auxiliary circuit-breakers of greater capacity in series therewith and between the feeder circuit-breakers and the generator, all at the distributing station, and electro-responsive devices of different time limits for tripping the several circuit-breakers.

6. An electric distribution system comprising several feeder circuits automatic feeder circuit-breakers in said circuits, group circuit-breakers each supplying a number of feeders, and electro-responsive devices for tripping the several circuit-breakers at different loads in time intervals that are shorter for the heavier loads.

7. An electric supply system comprising several feeder circuits automatic feeder circuit-breakers, a group circuit-breaker supplying said feeders, and time-limit relays in the several feeder circuits adapted to trip the feeder circuit-breaker at one predetermined overload and both the feeder and group circuit-breakers in case of a greater overload.

8. An electric supply station provided with a source of current supply, automatic bus-bar circuit-breakers, group circuit-breakers and feeder circuit-breakers in series relation, and electro-responsive devices for tripping the feeder circuit-breakers alone, the feeder and group circuit-breakers together, or all three together at different predetermined overloads.

9. An electric supply station provided with a source of current supply, automatic bus-bar circuit-breakers, group-circuit-breakers and feeder circuit-breakers in series relation, and electro-responsive time-limit devices for tripping the feeder circuit-breakers alone, the feeder and group circuit-breakers together, or all three together at different predetermined overloads and time limits.

10. An electric supply station provided with a source of current supply, a sectional bus-bar, automatic circuit-breakers between the several sections, automatic group circuit-breakers for the several bus-sections, a plurality of feeder circuit-breakers fed through each group circuit-breakers, and time-limit relays of shorter time value for the heavier breakers and responsive to different predetermined overloads.

11. An electric supply station provided with feeder circuit-breakers, group circuit-breakers fed in series through a sectional bus-bar, each of suitable capacity for its normal load, a plurality of circuit-breakers in series between the several bus-sections, series transformers adapted to trip the feeder or both the feeder and group circuit-breakers at different predetermined overloads, the tripping devices for the feeder breakers alone having a longer time-limit, and series transformers for tripping the bus-section breakers in a shorter time limit on a still more excessive overload.

12. In a system of distribution, the combination with a generator, of a feeder connected thereto, two circuit-breakers connected in series between the generator and the feeder, one set to trip under overload after a definite time interval, and means for tripping both circuit-breakers simultaneously under a greater overload after a shorter time interval.

13. An electric supply system comprising a plurality of generators, sectional bus-bars having different sections fed by different generators, feeders supplied from said bus-bars, circuit-breakers between the bus-bars and feeders tripping under overload after a time interval, and circuit-breakers between said sections tripping under excessive overload after a shorter time interval.

14. In a system of distribution, the combination with a generator and a feeder connected thereto, of a feeder circuit-breaker set to trip under overload after a time interval, a second circuit-breaker between the feeder circuit breaker and the generator, and means for tripping both circuit-breakers simultaneously under greater overload after a shorter time interval.

In witness whereof I have hereunto set my hand this 24th day of June, 1902.

SAMUEL W. MAUGER.

Witnesses:
BENJAMIN B. HULL,
HELEN ORFORD.